(No Model.)
T. J. BOUCH-TREMAYNE.
HORSE COLLAR.
No. 547,325.  Patented Oct. 1, 1895.
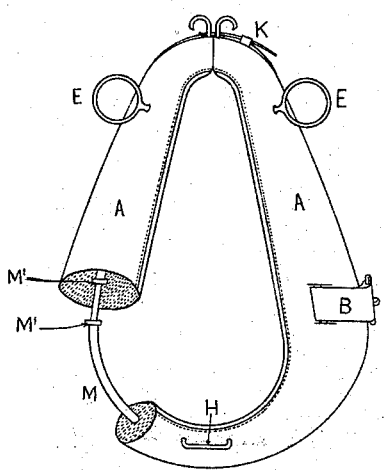
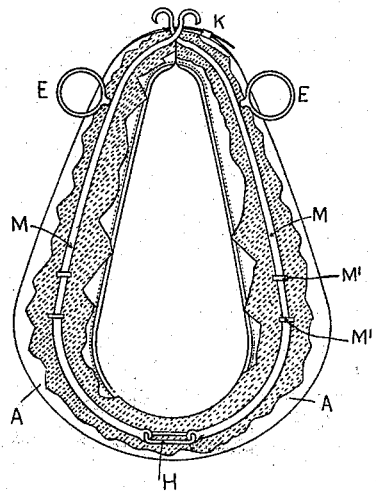
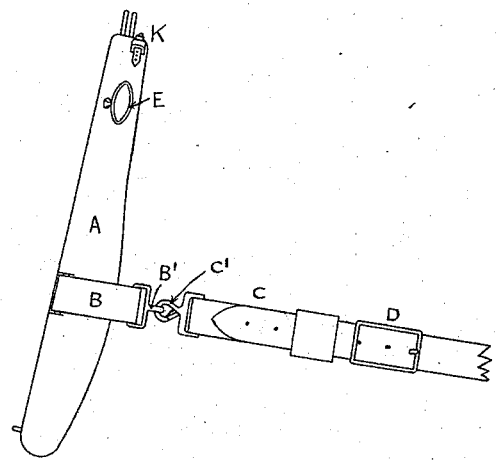
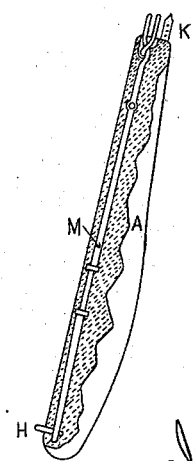
Witnesses
H. O. van Oldenneel
E. L. Scott
Inventor
Thomas Joseph Bouch-Tremayne
by
Attorneys

UNITED STATES PATENT OFFICE.

THOMAS JOSEPH BOUCH-TREMAYNE, OF MARINO, SOUTH AUSTRALIA.

HORSE-COLLAR.

SPECIFICATION forming part of Letters Patent No. 517,325, dated October 1, 1895.

Application filed June 17, 1895. Serial No. 553,065. (No model.)

*To all whom it may concern:*

Be it known that I, THOMAS JOSEPH BOUCH-TREMAYNE, gentleman, a subject of the Queen of Great Britain, and a resident of Brighton Road, Marino, in the Province of South Australia, have invented Improvements in Harness, and especially in Collars and Hames and the Connection of Traces Thereto, of which the following is a specification.

The object of these improvements is to provide means which will render the operation of harnessing horses to buggies, wagons, or other vehicles easier, and at the same time safer than by present methods.

In harness embodying my improvements the collar is made of the same shape as those at present in use, but may have a plain outside surface without any piping or groove. Instead of having external hames separate, detachable, and fastened together by two straps, one at the top and the other at the bottom, I embed a steel frame, constituting my hames, in the stuffing of the collar, whereby the collar and hames form one article incased in the same covering and secured by the same fastening. The collar opens at the top, and on being closed, after being lifted up into place, is held together by a clip formed by extending the hames upward and bending the tops into hooks which engage together, and this secures them, so as to leave both hands of the attendant free to buckle the single strap which completes the fastening and thoroughly secures the collar.

Figure 1 is a front view of the collar with portion of the covering and stuffing removed, showing on one side the tug attached and on the other side the portion of the hames to which the tug may be attached. Fig. 2 is a similar view with portion of the covering and stuffing removed to show the embedded hames. Fig. 3 is a side view of the collar and trace attachment. Fig. 4 is a side view of the collar with portion of the covering and stuffing removed to show the embedded hames and the clip at the top.

Referring, first, more particularly to Figs. 1 and 3, it will be seen that the collar has a plain outside covering A of substantially the same shape as that now in use, except that it has no piping or groove. Trace-tugs B B, rein-terrets E E, and a ring or link H for the breast-strap are provided in suitable positions. The collar is fastened when in position, first, by a clip formed by the two specially-bent tops of the embedded hames, and, secondly, by a strap and buckle K.

The tug B, to which the trace is attached, is shown in the form of a leather strap, one end of which encircles a portion of the embedded hame, while the other end is provided with an eye B', to which the trace C is attached by any convenient means, preferably a spring-hook C', the other end of the trace being connected in the usual way to the vehicle.

The embedded hames are inserted within the stuffing of the collar, as shown more particularly in Figs. 2 and 4. They consist of two steel bars M M, formed and bent to suitable shape, connected by a ring or link H at the bottom and having the top of each bent into the form of a hook, so that when placed on the horse's neck they hold the collar together. The ring or link H projects through the casing and takes the breast-strap. Tapped holes are provided in the bars M M, into which the shanks of the rein-terrets are screwed after the covering has been put on. Rims M' are also provided to hold the trace-tugs in the correct position.

Collars can be made according to this invention in any size or style to fit the horse and in any material and of any thickness or strength, with or without ornamentation, as may be required or preferred.

The trace-tugs may be connected to my collar and hames by buckles, swivels, hooks, or any other kind of attachment of any size or shape, so as to suit all kinds or forms of harness, but I prefer spring-hooks as being most convenient.

Having now particularly described and ascertained the nature of my said invention and in what manner the same is to be performed, I declare that what I claim is—

1. In combination a pad divided at its upper end, the hames embedded therein and connected together at both the upper and lower ends and the link for connecting the said lower ends, said link being embedded in the pad and projecting to the outside thereof, and the said upper ends of the hames projecting from the pad and twisted into locking engagement with each other, substantially as described.

2. In combination, the pad, the hames embedded therein and having projecting ends twisted to interlock and temporarily hold the pad while the same is being fastened and the fastening means for holding the upper ends of the pad together, said fastening means being independent of the twisted interlocking ends of the hames, substantially as described.

3. In combination, the pad, the hames embedded therein, the link at the lower end for connecting the lower ends of the embedded hames together, said link projecting through the pad from its point of connection with the embedded hames to the outside for the attachment of the breast strap, substantially as described.

In testimony that I claim the foregoing as my invention I have signed my name, in presence of two witnesses, this 25th day of April, 1895.

THOMAS JOSEPH BOUCH-TREMAYNE.

Witnesses:
CHARLES NICHOLAS COLLISON,
ARTHUR GORE COLLISON.